(12) United States Patent
Duffield

(10) Patent No.: US 7,424,797 B2
(45) Date of Patent: Sep. 16, 2008

(54) WATER-SOLUBLE CONTAINERS

(75) Inventor: John Paul Duffield, Hull (GB)

(73) Assignee: Reckitt Benckiser (UK) Limited, Slough, Berkshire (GB)

( * ) Notice: Subject to any disclaimer, the term of this patent is extended or adjusted under 35 U.S.C. 154(b) by 158 days.

(21) Appl. No.: 10/499,418

(22) PCT Filed: Dec. 18, 2002

(86) PCT No.: PCT/GB02/05762

§ 371 (c)(1), (2), (4) Date: Jun. 18, 2004

(87) PCT Pub. No.: WO03/055767

PCT Pub. Date: Jul. 10, 2003

(65) Prior Publication Data

US 2005/0048234 A1 Mar. 3, 2005

(30) Foreign Application Priority Data

Dec. 21, 2001 (GB) .................................. 0130588.7

(51) Int. Cl.
   *B65B 47/00* (2006.01)
(52) U.S. Cl. .......................................... 53/453; 53/559
(58) Field of Classification Search .................. 53/450, 53/452, 453, 558, 559
   See application file for complete search history.

(56) References Cited

U.S. PATENT DOCUMENTS

| | | | |
|---|---|---|---|
| 3,882,196 A * | 5/1975 | Hanke | 524/414 |
| 4,620,999 A | 11/1986 | Holmes | 428/35 |
| 4,806,261 A * | 2/1989 | Ciallella et al. | 510/296 |
| 5,224,601 A * | 7/1993 | Gouge et al. | 206/524.7 |
| 5,362,532 A | 11/1994 | Famili et al. | 428/36.6 |
| 5,429,874 A | 7/1995 | VanPutte | 428/522 |
| 5,441,805 A * | 8/1995 | Kwok | 428/339 |
| 5,487,947 A | 1/1996 | Kakishita et al. | 428/424.4 |
| 5,490,967 A | 2/1996 | Martin et al. | 264/322 |
| 5,632,133 A | 5/1997 | Wyslotsky | 53/433 |
| 5,786,092 A * | 7/1998 | Lorenzo et al. | 428/423.1 |
| 6,281,183 B1 * | 8/2001 | Harbour | 510/406 |
| 6,378,274 B1 * | 4/2002 | Harbour | 53/453 |
| 6,898,921 B2 * | 5/2005 | Duffield | 53/453 |
| 7,105,478 B2 * | 9/2006 | Guzmann et al. | 510/439 |

FOREIGN PATENT DOCUMENTS

| | | |
|---|---|---|
| EP | 1 072 675 A2 | 1/2001 |
| GB | 2 244 258 A | 11/1991 |
| WO | WO 97/00282 | 1/1997 |
| WO | WO 98/21118 | 5/1998 |

OTHER PUBLICATIONS

International Search Report for PCT/GB02/05762 Dec. 13, 2003.
Search report for GB 0130588.7 dated Jun. 24, 2002.

* cited by examiner

*Primary Examiner*—Louis Huynh

(57) ABSTRACT

A process for preparing a water-soluble container having a thermoformed pocket and a lid, wherein a water soluble laminated film containing the pocket is produced comprising at least one extruded polyvinyl film laminated to at least one solution cast polyvinyl alcohol film, a composition such as fabric care, surface care, dishwashing, water-softening, laundry, detergent or a rinse-aid composition is filled into the pocket, and the filled pocket is sealed with a lid comprising a solution cast polyvinyl alcohol film on a surface facing the pocket to form a sealed water-soluble container containing a composition.

13 Claims, No Drawings

WATER-SOLUBLE CONTAINERS

This application is a national stage application under 35 USC 371 of PCT/GB02/05762, filed on Dec. 18, 2002.

FIELD OF INVENTION

The present invention relates to water-soluble containers comprising water-soluble laminated films.

BACKGROUND OF INVENTION

Water-soluble laminated films are known for many uses. For example, they may be used for packaging. The packages are simply added to water, the packaging dissolves or disperses and the contents of the package are released. Laminated films comprise a plurality of different layers and may have certain advantages over single films. For example, GB-A-2,244,258 teaches that a water-soluble laminated film may be used to package a hazardous chemical dissolved or dispersed in a liquid or gel. While a single film may have pinholes, the two films in a laminate are unlikely to have pinholes which coincide. Thus the risk of leakage is reduced by using a laminated film.

There are many known processes for producing films which can then be laminated. If two or more identical films, or films of the same polymer, are laminated together, the films are generally made by the same process, for example by extrusion blowing or solution casting. This is also the case even if two or more different films are laminated together.

SUMMARY OF THE INVENTION

The present invention provides a container comprising a thermoformed pocket and a lid, wherein the pocket comprises a water-soluble laminate comprising at least one extruded film laminated to at least one solution cast film.

The present invention also provides a process for preparing a water-soluble laminate which comprises simultaneously thermoforming and laminating together a film stack comprising at least one extruded film and at least one solution cast film.

DETAILED DESCRIPTION OF THE INVENTION

Extruded films and solution cast films are both well known types of polymer films. Details can be found, for example, in "Packages of Pesticides and Potentially Hazardous Chemicals for Consumer Use", D. Edwards, published in 1996 by Pira.

Extruded films are prepared from molten polymer compositions which are passed through an extruder and formed into a film. Examples of extruded films are blown films and extrusion cast films.

An extruded blown film is produced by an extrusion followed by a blowing step. In a blowing process a polymer composition, often in the form of pellets, is melted and extruded, either in a single step in or more than one step, through an annular die to form a tube. The polymer composition comprises not only the polymer itself but also optionally any desired additives, such as a plasticiser. Air or another gas is blown into the inside of the tube to expand it and cause thinning of the walls. The expanded film bubble is then collapsed, and the edges optionally removed, to form films sheets. The bubble may also be cut and opened to produce a single layer of film. Steps may be taken to ensure that the inside and outside surfaces of the bubble do not stick to each other, for example by introducing a small amount of lubricant, for example a particulate material such as starch, talc or magnesium stearate, inside the bubble or between sheets.

It is also possible to collapse the bubble to form a flattened bubble with the sides of the flattened bubble resting on each other to form a film stack (known as a "lay flat"). The film stack may optionally be passed through nip rollers to ensure the stack does not immediately fall apart. Usually the film stack will consist of two layers, but, if the bubble is folded appropriately, the film stack may consist of more than two layers, for example four or six layers. The sides of the collapsed bubble may be trimmed off, or left on if they do not interfere with the further processing of the film stack. Because the film stack is produced from a collapsed bubble, the layers are identical to each other, having the same composition. Regardless of the blowing process used, the sheets are then used directly in another process or wound on a roller for storage and later use.

An extrusion cast film is prepared by an initial extrusion step as described above. The extrusion, however, is carried out through a slot die and the polymer is cast onto a surface. A suitable surface is a heated, room temperature or cooled surface. The surface may be stationary or moving. Preferred surfaces are a drum, cylinder or belt. The thickness of the cast film depends mainly on the size of the die, the throughput of the extruder and the casting, but may be further controlled. The extrusion cast film is then allowed to solidify and then removed from the surface. The rate of solidification may optionally be increased with cooling or with removal of the source of heat from the surface if the surface is heated. The film is then used directly in another process or wound on to a core for storage and later use.

The extrusion blow and extrusion cast processes are described in the literature, for example, the paper entitled "The utilization of coextrusion methods for the manufacture of packaging film" by William N Heck presented at the second Biennal Marshall International Cheese Conference in Wisconsin on 15 to 18 Sep. 1981.

In a solution casting process a polymer, again often in the form of pellets, is dissolved in a solvent. A suitable solvent is, for example, water if the polymer is water-soluble. Organic solvents may also be used if appropriate. Additives such as a plasticiser may also be added to the solution, either separately or by previous incorporation into the polymer composition before it is dissolved. The polymer solution is then cast onto a surface, for example from the bottom of a vessel. A suitable surface is a heated, room temperature or cooled surface. The surface may be stationary or moving. Preferred surfaces are a drum, cylinder or belt. The thickness of the cast film is desirably controlled, for example by a doctor blade. The cast film is then allowed to solidify by evaporation of the solvent, especially by heating, and then removed from the surface. The film may optionally be cooled or some of the heat removed before it is removed from the surface. The film is then used directly in another process or wound on to a core for storage and later use.

Films produced using the extrusion process are known to have different properties from films produced using the solution process. For example, water-soluble films produced from solution are generally very plastic, elastic and flexible compared to extruded films of the same polymer. Extruded films are generally harder, stiffer and more crystalline. Each type of film may be used in certain processes, but often is not ideally suited to that process.

This is the case, for example, in a thermoforming process where a film is heated and moulded. A water-soluble extruded film is much easier to work with in such a process than a film produced from solution. It is gripped easier by the feeding rollers and has a relatively high dimensional stability (in particular it does not stretch too much). Furthermore it has a relatively shiny surface and the film is transparent, which is considered attractive by consumers on the finished, thermoformed article. A film produced from solution is wetter, tacky, stretches more easily, sticks to surfaces and is more opaque. This makes it very difficult, if not impossible, to feed a water-soluble film produced from solution through a thermoforming machine. Additionally, certain polymers such as poly (vinyl alcohol) (PVOH) are known to shrink back after thermoforming, which is the so-called "memory effect". This is generally considered to be a disadvantage since it makes it difficult to fill moulded PVOH containers. Extruded films have a higher Tg than films produced from solution, and are also less elastic. For example, extruded PVOH films have a glass transition temperature Tg of 20 to 30° C., whereas PVOH films produced from solution have a glass transition temperature Tg of −4 to −50° C. Therefore, extruded films are subject to a lesser memory effect during normal processing temperatures.

We have surprisingly discovered that a water-soluble laminate of an extruded film and a solution cast film can advantageously be used when producing a container by thermoforming. In particular, such a laminate can be used in a thermoforming machine and yet has at least some characteristics which are better than those of a pure extruded or a pure solution cast film. Furthermore, the important advantageous characteristics of the extruded film, such as its ease of processing, are generally retained.

A laminated film can have better dissolution characteristics since we have found that a solution cast film is more easily soluble than an extruded film. Thus a laminated film comprising both an extruded film and a solution cast film has better dissolution properties, in particular quicker dissolution, than a film of the same thickness but which has been produced only by an extrusion process.

We have also found that a solution cast film has better sealing characteristics than an extruded film, particularly when a composition containing water is packaged in the container. A heat-seal on a solution cast film is generally stronger than a heat-seal on an extrusion film, due, it is believed, because of the softness of the solution films. Thus a laminate of the present invention, when sealed via the solution cast film layer, can have a stronger heat seal to another film, than an extruded film can have the same film. Therefore an article such as a container comprising a laminate of the present invention with the solution cast film innermost has a better seal than an article comprising an extruded film on its innermost surface.

Furthermore a solution cast film generally has a softer feel than an extruded film, which is often preferred by consumers. Therefore an article such as a container comprising a laminate of the present invention with the solution cast film outermost has a better feel than an article comprising an extruded film on its outermost surface.

In addition, a solution cast film is generally produced at a lower temperature than an extruded film. Thus it is possible to incorporate components into a cast solution film which cannot be incorporated into an extruded film because they would decompose at the higher temperatures encountered during the extrusion process. It is therefore possible to prepare a solution cast film of some polymers which cannot be produced by an extrusion process. For example, PVOH can be modified, for example esterified, to block active hydroxyl or residual acetate sites, especially with alkylene oxides such as methylene, ethylene or propylene oxide. This modified PVOH is less subject to attack by components such as acids or crosslinking agents, and can hence be used advantageously to package compositions such as acidic compositions or compositions containing perborates. Such a modified PVOH cannot be extruded since it decomposes at the temperatures used during the extrusion process, but it can be solution cast. Thus, while a pure extruded film cannot be prepared from this modified PVOH, it can be included in the laminate of the present invention.

Furthermore, it is well known that certain polymers, such as PVOH, lead to shrink-back from a thermoforming mould very quickly, leading to problems of filling and spillage. We have surprisingly found that a laminate comprising an extruded film, preferably a blown film, does not suffer from this problem, or suffer it to a reduced extent, especially when the extruded film is outermost.

In the present invention at least one extruded film and at least one solution cast film are laminated together. The film laminate comprises a plurality of layers, for example 2, 3, 4, 5 or 6 layers. For example, a laminate can consist of one extruded film and one solution cast film. It may also consist of a single extruded film and two or more solution cast films or a single solution cast films and two or more extruded films. For example, the laminate may be a three-ply laminate consisting of an extruded film sandwiched between two solution cast films, or a solution cast film sandwiched between two extruded films.

It is also possible for a three-ply laminate to consist of an extruded or solution cast film sandwiched between an extruded film and a solution cast film. The laminate can also consist of two or more extruded films laminated to two or more solution cast films. In this embodiment the solution cast films and the extruded films may be, for example, interleaved throughout the laminate, one or more cast films may be laminated together or one or more extruded films may be laminated together. The extruded film is preferably a blown film, although it may, of course, be an extrusion cast film. If more than one extruded film is present in a laminate, they are all preferably blown films, although they may also all be extrusion cast films or a mixture of blown and extruded cast films.

In general each film is a single film. However, it is possible for one or more of the films, or even all of the films, to be laminates themselves. Such laminates may be formed, for example, by coextrusion.

The polymers making up the at least one extruded film and the at least one solution cast film may be the same or different. One or more polymer can independently be included in each film layer. An example of a preferred water-soluble polymer is PVOH. Other examples are cellulose derivatives such as hydroxypropyl methyl cellulose (HPMC), poly(vinylpyrrolidone) (PVP), poly(acrylic acid) or an ester thereof, poly(maleic acid) or an ester thereof, gelatin, gums such as locust bean gum or guar gum, alginates and vegetable starches. Copolymers of any of the above may also be used.

In the laminate, all of the polymers are water-soluble (which term is taken to include water-dispersible), for example in cold or warm water. By choosing an appropriate polymer it is possible to ensure that the water-soluble polymer dissolves at a desired temperature. Thus the polymer may be cold water (20° C.) soluble, but may be insoluble in cold water and only become soluble in warm or hot water having a temperature of, for example, 30° C., 40° C., 50° C. or even 60° C. The PVOH may be partially or fully alcoholised or hydrolysed. For example it may be from 40 to 100%, preferably from 70 to 92%, more preferably about 88%, alcoholised or hydrolysed. The degree of hydrolysis is known to influence the temperature at which the PVOH starts to dissolve in water.

Modified PVOH polymers such as ethoxylated PVOH may also be used. If desired, the PVOH film may be substantially anhydrous, for example having a water content of less than 5 wt %.

It is, of course, well understood by one skilled in the art that some polymers are unsuitable for extruding or solution casting. For example, although many PVOH polymers can be solution cast or extruded, other polymers such as cellulose derivatives can generally only be solution cast and not extruded. Thus, for example, the laminate of the present invention may comprise at least one extruded PVOH or PVP film and at least one cast PVOH, PVP, cellulose derivative, poly(acrylic acid) or ester thereof, poly(maleic acid) or ester thereof, gelatin, gum, aliginate or vegetable starch film.

Desirably the water-soluble film consists essentially of, or consists of, the water-soluble polymer composition. It is possible for suitable additives such as plasticisers, lubricants and colouring agents to be added. Components which modify the properties of the polymer may also be added. Plasticisers are generally used in an amount of up to 20 wt %, for example from 10 to 20 wt %. Lubricants are generally used in an amount of 0.5 to 5 wt %. The polymer may therefore be used in an amount of from 75 to 84.5 wt %, based on the total amount of the polymer composition. Suitable plasticisers are, for example, pentaerythritols such as depentaerythritol, sorbitol, mannitol, glycerine and glycols such as glycerol, ethylene glycol and polyethylene glycol. Solids such as talc, stearic acid, magnesium stearate, silicon dioxide, zinc stearate or colloidal silica may be used as lubricants.

It is also possible to include one or more particulate solids in the moulding composition in order to accelerate the rate of dissolution of the film. Dissolution of the solid in water is sufficient to cause an acceleration in the break-up of the film, particularly if a gas is generated or the solid expands.

Examples of such solids are starches such as corn, potato or maize starch or sodium starch glycolate and alkali and alkaline earth metal, such as sodium, potassium, magnesium and calcium, bicarbonate and carbonate, in conjunction with an acid.

Suitable acids are, for example acidic substances having carboxylic or sulfonic acid groups or salts thereof. Examples are cinnamic, tartaric, mandelic, fumaric, maleic, malic, palmoic, citric and naphthalene disulfonic acids, as free acids or as their salts, for example with alkali or alkaline earth metals.

The thicknesses of each film in the laminate may be the same or different. The thickness of each layer is preferably 20 to 150 µm, more preferably 40 to 100 µm, especially 50 to 90 µm, more especially 50 to 80 µm. The thickness of the plurality of films making up the film stack before lamination and of the laminate is preferably 40 to 300 µm, more preferably 80 to 200 µm, especially 100 to 160 µm, more especially 100 to 160 µm and most especially 110 to 140 µm. It is preferred that the thickness of the extruded film in the laminate of the present invention is as thin as possible, since it is generally desired to have the advantageous properties of the solution cast film. Therefore, in a preferred embodiment of the invention, the total thickness of all of the extruded films in the laminate is less than the total thickness of all of the solution cast films.

Films made by the solution casting or extrusion casting processes are generally unoriented, although extrusion cast films may be oriented by stretching during the casting process if desired. Films made by the blowing process are generally oriented by the blowing step. Each film layer may independently be unoriented, mono-axially oriented or bi-axially oriented. If more than one film in the laminate is oriented, they may have the same orientation, or their planes of orientation may be different if desired. The final laminate may also be unoriented, mono-axially oriented or bi-axially oriented. Orientation may be provided by, for example, stretching each film before it is laminated or by stretching the laminate after it is formed.

Lamination may be carried out by any desired process. For example, lamination can be carried out before the laminate is further processed, in particular by thermoforming. Thus the films making up the film stack may be heated to adhere them together. An adhesive layer may also be provided.

Lamination may be assisted by the use of a pressure or vacuum. If two adjacent films are soluble in the same solvent, that solvent may be applied to one or both adjacent surfaces to ensure adhesion. Since the films are water-soluble, a suitable solvent is water or an aqueous solution of the polymers making up the films. For example, if one of the films is PVOH, a suitable solvent is an aqueous solution of PVOH. The adhesive may be applied, for example, casting or by printing. Desirably a pattern of adhesive is applied, such as a stipple pattern.

It is also possible for lamination to be carried out simultaneously with another process. For example, lamination can occur in a thermoforming mould. This process allows for the production of a thermoformed, laminated film in one step, avoiding the use of an additional step using heating or adhesive, along with pressure or a vacuum, to laminate the films. This reduces capital expenditure and other costs, as well as reducing complexity and production time, as compared with processes in which the laminate is pre-formed.

It is well known that thermoforming a film in a mould causes localised thinning of the film, particularly at the regions in the corners of the mould. This can often cause problems, especially when the moulded film is used for packaging liquid compositions which tend to leak from thinned areas. We have surprisingly discovered that when lamination takes place simultaneously with thermoforming, the inner film, generally the solution cast film, is not thinned as much as the outer film. It is primarily the outer film which is thinned. In this way, the thickness of a laminated film at the corners prepared by this embodiment of the present invention is greater than that of a film prepared by other processes.

In this embodiment the final laminate can be formed during the thermoforming step. However, it is possible for the film stack prior to thermoforming to comprise one or more laminated layers within the film stack, so long as the film stack is not completely laminated before it is thermoformed. The layers may be individually produced and then simply placed on top of each other before the thermoforming step.

The film stack may be formed at any time before or during the thermoforming step. Thus, for example, the stack may be formed in a first step, and the entire stack introduced into the thermoforming machine from a single film roller. Another possibility is that the films are separately introduced into the thermoforming machines on two or more rollers, and the film stack formed inside the machine. The roller(s) are preferably driven to control the film tension. When the films are brought together it is preferred to press them together before thermoforming to exclude air from between the films that would otherwise interfere with the lamination process. For example, the films may be passed through a set of pinch rollers.

In this embodiment the laminate may be formed by the action of heat and pressure or vacuum from the heating plate or the mould, or a combination of the two, during the thermoforming process. It is, however, desirable for the lamination to occur while the film stack is being drawn down or blown down into the mould. Thus, for example, the film stack is heated to the thermoforming temperature using a normal thermoforming heater plate assembly, and then drawn down under vacuum or blown down under pressure into the mould. The thermoforming temperature, pressure or vacuum and dwell time depend on the polymer or mixture of polymers being used.

Regardless of whether the laminate is thermoformed after it is formed, or whether the laminate is formed simultaneously with thermoforming, a suitable forming temperature for PVOH or ethoxylated PVOH is, for example, from 90 to 130° C. especially 90 to 120° C. A suitable forming pressure is, for example, 60 to 138 kPa (10 to 20 p.s.i.), especially 69 to 103 kPa (10 to 15 p.s.i.). A suitable forming vacuum is 0 to 4 kPa (0 to 20 mbar), especially 0 to 2 kPa (0 to 20 mbar). A suitable dwell time is, for example, 0.4 to 2.5 seconds, especially 2 to 2.5 seconds.

One skilled in the art can choose an appropriate temperature, pressure or vacuum and dwell time, for example to achieve a laminate of the desired integrity during simultaneous thermoforming and lamination. The amount of vacuum or pressure used depends on the thickness and porosity of the film. While desirably conditions are chosen within the above ranges, it is possible to use one or more these parameters outside the above ranges, although it may be necessary to compensate by changing the values of the other two parameters.

The present invention also provides a process for producing a container as defined above which comprises:
a. producing a water-soluble laminated film containing a pocket, said laminated film comprising at least one extruded film laminated to at least one solution cast film;
b. filling the pocket with a composition, especially a liquid composition; and
c. placing a film on top of the filled pocket and sealing the film to the pocket to produce a closed container.

In this embodiment of the invention, the pocket is produced by thermoforming (e.g. by vacuum forming) and is sealed by placing a film, especially a solution cast film, on top of the filled pocket and sealing the film to the film making up the pocket, for example by heat sealing. Such a process is disclosed, for example, in WO 00/55068.

The container is desirably completely water-soluble so that it can simply be added to an aqueous environment where it will dissolve to release its contents.

A pre-formed laminate may be moulded, or simultaneous lamination and thermoforming carried out.

The film placed on top of the pocket in the thermoforming process is preferably water-soluble. The laminate forming the pocket and the top film may be formed from the same or different compositions. The top film may be a single film or a laminate, for example of a solution cast film and a solution cast film, an extruded film and a solution cast film, or an extruded film and an extruded film. The extruded film is preferably a blown film. Desirably at least one, and preferably both, of the films making up the container is formed from PVOH.

The covering film desirably has a thickness which is less than that of the laminate making up the pocket because it will not generally be thermoformed so localised thinning of the sheet will not occur. It is also desirable to have a thickness which is less than that of the film stack to ensure a sufficient heat transfer through the films to soften the base web, for example during heat sealing. The thickness of the covering film will generally be from 20 to 160 µm, preferably from 40 to 100 µm, such as 40 to 80 µm or 50 to 75 µm.

The films may be sealed together by any suitable means, for example by means of an adhesive or by heat sealing.

A suitable sealing temperature is, for example, 120 to 195° C., for example 140 to 150° C. A suitable sealing pressure is, for example from 250 to 600 kPa. Examples of sealing pressures are 276 to 414 kPa (40 to 60 p.s.i.) or 400 to 600 kPa (4 to 6 mbar). Suitable sealing dwell times are 0.4 to 2.5 seconds.

One skilled in the art can use an appropriate temperature, pressure and dwell time to achieve a seal of the desired integrity. While desirably conditions are chosen within the above ranges, it is possible to use one or more of these parameters outside the above ranges, although it may be necessary to compensate by changing the values of the other two parameters.

The composition may be any composition which is intended to be released in an aqueous environment if the container is water-soluble. Thus, for example, it may be an agrochemical composition such as a plant protection agent, for instance a pesticide such as an insecticide, fungicide, herbicide, acaricide, or nematocide, a plant growth regulator or a plant nutrient. Such compositions are generally packaged in amounts of from 0.1 g to 7 kg, preferably 1 to 5 kg, when in solid form. When in liquid or gelled form, such compositions are generally packaged in amounts of from 1 ml to 10 litres, preferably 0.1 to 6 litres, especially from 0.5 to 1.5 litres.

The composition may also be a fabric care, surface care or dishwashing composition. Thus, for example, it may be a dishwashing, water-softening, laundry or detergent composition, or a rinse aid. Such compositions may be suitable for use in a domestic washing machine. The composition may also be a disinfectant, antibacterial or antiseptic composition, or a refill composition for a trigger-type spray. Such compositions are generally packaged in amounts of from 5 to 100 g, especially from 15 to 40 g. For example, a dishwashing composition may weigh from 15 to 30 g, a water-softening composition may weigh from 15 to 40 g, and a laundry composition may weigh from 15 to 40 g.

The composition(s) may be a solid. For example, it may be a particulate or granulated solid, or a tablet. It may also be a liquid, which may be thickened or gelled if desired. The liquid composition may be non-aqueous (i.e. anhydrous) or aqueous, for example comprising less than or more than 5 wt % total or free water. An anhydrous composition generally contains less than 1 wt %, preferably less than 0.5 wt % water. The composition may have more than one phase. For example it may comprise an aqueous composition and a liquid composition which is immiscible with the aqueous composition. It may also comprise a liquid composition and a separate solid composition, for example in the form of a ball, or pill or speckles. The liquid composition may be thickened or gelled.

If the composition is an aqueous liquid having a relatively high water content, for example above 5 wt % water, it may be necessary to take steps to ensure that the liquid does not attack the water-soluble polymer if it is soluble in cold water, or water up to a temperature of, say, 35° C. Steps may be taken to treat the inside surfaces of the container, for example by coating it with agents such as PVdC (poly(vinylidene dichloride)) or PTFE (polytetrafluoroethylene), or to adapt the composition to ensure it does not dissolve the polymer. For example, it has been found that ensuring the composition has a high ionic strength or contains an agent which minimises water loss through the walls of the container will prevent the composition form dissolving the polymer from the inside. This is described in more detail in EP-A-518,689 and WO 97/27,743.

The laminate is particularly suited to packaging aqueous compositions, which tend to reduce the seal strength of containers enclosing them. We have surprisingly found that the laminate of the present invention retains a high seal integrity strength when packaging aqueous compositions having a high water content such that no leakage through the seal occurs.

The containers produced by the process of the present invention may, if desired, have a maximum dimension of 5 cm, excluding any flanges. For example, a container may have a length of 1 to 5 cm, especially 3.5 to 4.5 cm, a width of 1.5 to 3.5 cm, especially 2 to 3 cm, and a height of 1 to 2 cm, especially 1.25 to 1.75 cm.

Examples of surface care compositions are those used in the field of surface care, for example to clean, treat or polish a surface. Suitable surfaces are, for example, household surfaces such as worktops, as well as surfaces of sanitary ware, such as sinks, basins and lavatories. The ingredients of each composition depend on the use of the composition. Thus, for example, the composition may contain surface active agents such as an anionic, non-ionic, cationic, amphoteric or zwitterionic surface active agents or mixtures thereof.

Examples of anionic surfactants are straight-chained or branched alkyl sulfates and alkyl polyalkoxylated sulfates, also known as alkyl ether sulfates. Such surfactants may be produced by the sulfation of higher $C_8$-$C_{20}$ fatty alcohols.

Examples of primary alkyl sulfate surfactants are those of formula:

$ROSO_3^- M^+$ wherein R is a linear $C_8$-$C_{20}$ hydrocarbyl group and M is a water-solubilising cation. Preferably R is $C_{10}$-$C_{16}$ alkyl, for example $C_{12}$-$C_{14}$, and M is alkali metal such as lithium, sodium or potassium.

Examples of secondary alkyl sulfate surfactants are those which have the sulfate moiety on a "backbone" of the molecule, for example those of formula:

$CH_2(CH_2)_n(CHOSO_3^- M^+)(CH_2)_m CH_3$ wherein m and n are independently 2 or more, the sum of m+n typically being 6 to 20, for example 9 to 15, and M is a water-solubilising cation such as lithium, sodium or potassium.

Especially preferred secondary alkyl sulfates are the (2,3) alkyl sulfate surfactants of formulae:

$CH_2(CH_2)_x(CHOSO_3^- M^+)CH_3$ and $CH_3(CH_2)_x(CHOSO_3^- M^+)CH_2 CH_3$ for the 2-sulfate and 3-sulfate, respectively. In these formulae x is at least 4, for example 6 to 20, preferably 10 to 16. M is cation, such as an alkali metal, for example lithium, sodium or potassium.

Examples of alkoxylated alkyl sulfates are ethoxylated alkyl sulfates of the formula:

$RO(C_2H_4O)_n SO_3^- M^+$ wherein R is a $C_8$-$C_{20}$ alkyl group, preferably $C_{10}$-$C_{18}$ such as a $C_{12}$-$C_{16}$, n is at least 1, for example from 1 to 20, preferably 1 to 15, especially 1 to 6, and M is a salt-forming cation such as lithium, sodium, potassium, ammonium, alkylammonium or alkanolammonium. These compounds can provide especially desirable fabric cleaning performance benefits when used in combination with alkyl sulfates.

The alkyl sulfates and alkyl ether sulfates will generally be used in the form of mixtures comprising varying alkyl chain lengths and, if present, varying degrees of alkoxylation.

Other anionic surfactants which may be employed are salts of fatty acids, for example $C_8$-$C_{18}$ fatty acids, especially the sodium or potassium salts, and alkyl, for example $C_8$-$C_{18}$, benzene sulfonates.

Examples of non-ionic surfactants are fatty acid alkoxylates, such as fatty acid ethoxylates, especially those of formula:

$R(C_2H_4O)_n OH$ wherein R is a straight or branched $C_8$-$C_{16}$ alkyl group, preferably a $C_9$-$C_{15}$, for example $C_{10}$-$C_{14}$, alkyl group and n is at least 1, for example from 1 to 16, preferably 2 to 12, more preferably 3 to 10.

The alkoxylated fatty alcohol non-ionic surfactant will frequently have a hydrophilic-lipophilic balance (HLB) which ranges from 3 to 17, more preferably from 6 to 15, most preferably from 10 to 15.

Examples of fatty alcohol ethoxylates are those made from alcohols of 12 to 15 carbon atoms and which contain about 7 moles of ethylene oxide. Such materials are commercially marketed under the trademarks Neodol 25-7 and Neodol 23-6.5 by Shell Chemical Company. Other useful Neodols include Neodol 1-5, an ethoxylated fatty alcohol averaging 11 carbon atoms in its alkyl chain with about 5 moles of ethylene oxide; Neodol 23-9, an ethoxylated primary $C_{12}$-$C_{13}$ alcohol having about 9 moles of ethylene oxide; and Neodol 91-10, an ethoxylated $C_9$-$C_{11}$ primary alcohol having about 10 moles of ethylene oxide.

Alcohol ethoxylates of this type have also been marketed by Shell Chemical Company under the Dobanol trademark. Dobanol 91-5 is an ethoxylated $C_9$-$C_{11}$ fatty alcohol with an average of 5 moles ethylene oxide and Dobanol 25-7 is an ethoxylated $C_{12}$-$C_{15}$ fatty alcohol with an average of 7 moles of ethylene oxide per mole of fatty alcohol.

Other examples of suitable ethoxylated alcohol on-ionic surfactants include Tergitol 15-S-7 and Tergitol 15-S-9, both of which are linear secondary alcohol ethoxylates available from Union Carbide Corporation. Tergitol 15-S-7 is a mixed ethoxylated product of a $C_{11}$-$C_{15}$ linear secondary alkanol with 7 moles of ethylene oxide and Tergitol 15-S-9 is the same but with 9 moles of ethylene oxide.

Other suitable alcohol ethoxylated non-ionic surfactants are Neodol 45-11, which is a similar ethylene oxide condensation products of a fatty alcohol having 14-15 carbon atoms and the number of ethylene oxide groups per mole being about 11. Such products are also available from Shell Chemical Company.

Further non-ionic surfactants are, for example, $C_{10}$-$C_{18}$ alkyl polyglycosides, such s $C_{12}$-$C_{16}$ alkyl polyglycosides, especially the polyglucosides. These are especially useful when high foaming compositions are desired. Further surfactants are polyhydroxy fatty acid amides, such as $C_{10}$-$C_{18}$ N-(3-methoxypropyl) glycamides and ethylene oxide-propylene oxide block polymers of the Pluronic type.

Examples of cationic surfactants are those of the quaternary ammonium type.

The total content of surfactants in the composition is desirably 60 to 95 wt %, especially 75 to 90 wt %. Desirably an anionic surfactant is present in an amount of 50 to 75 wt %, the non-ionic surfactant is present in an amount of 5 to 20 wt %, and/or the cationic surfactant is present in an amount of from 0 to 20 wt %. The amounts are based on the total solids content of the composition, i.e. excluding any solvent which may be present.

The composition, particularly when used as laundry washing or dishwashing composition, may also comprise enzymes, such as protease, lipase, amylase, cellulase and peroxidase enzymes. Such enzymes are commercially available and sold, for example, under the registered trade marks Esperesc, Alcalasc and Savinasc by Nova Industries A/S and Maxatasc by International Biosynthetics, Inc. Desirably the enzymes are present in the composition in an amount of from 0.5 to 3 wt %, especially 1 to 2 wt %.

The composition may, if desired, comprise a thickening agent or gelling agent. Suitable thickeners are polyacrylate polymers such as those sold under the trade mark CARBOPOL, or the trade mark ACUSOL by Rohm and Hass Company. Other suitable thickeners are xanthan gums. The thickener, if present, is generally present in an amount of from 0.2 to 4 wt %, especially 0.5 to 2 wt %.

Dishwasher compositions usually comprise a detergency builder. Suitable builders are alkali metal or ammonium phosphates, polyphosphates, phosphonates, polyphosphonates, carbonates, bicarbonates, borates, polyhydroxysulfonates, polyacetates, carboxylates such as citrates, and polycarboxylates. The builder is desirably present in an amount of up to 90 wt %, preferably 15 to 90 wt %, more preferable 15 to 75 wt %, relative to the total weight of the composition. Further details of suitable components are given in, for example, EP-A-694,059, EP-A-518,720 and WO 99/06522.

The compositions can also optionally comprise one or more additional ingredients. These include conventional detergent composition components such as further surfactants, bleaches, bleach enhancing agents, builders, suds boosters or suds suppressors, anti-tarnish and anti-corrosion agents, organic solvents, co-solvents, phase stabilisers, emulsifying agents, preservatives, soil suspending agents, soil release agents, germicides, pH adjusting agents or buffers, non-builder alkalinity sources, chelating agents, clays such as smectite clays, enzyme stabilizers, anti-limescale agents, colourants, dyes, hydrotropes, dye transfer inhibiting agents, brighteners, and perfumes. If used, such optional ingredients will generally constitute no more than 10 wt %, for example from 1 to 6 wt %, the total weight of the compositions.

The builders counteract the effects of calcium, or other ion, water hardness encountered during laundering or bleaching use of the compositions herein. Examples of such materials are citrate, succinate, malonate, carboxymethyl succinate, carboxylate, polycarboxylate and polyacetyl carboxylate salts, for example with alkali metal or alkaline earth metal cations, or the corresponding free acids. Specific examples are sodium, potassium and lithium salts of oxydisuccinic acid, mellitic acid, benzene polycarboxylic acids, $C_{10}$-$C_{22}$ fatty acids and citric acid. Other examples are organic phosphonate type sequestering agents such as those sold by Monsanto under the trade mark Dequest and alkylhydroxy phosphonates. Citrate salts and $C_{12}$-$C_{18}$ fatty acid soaps are preferred.

Other suitable builders are polymers and copolymers known to have builder properties. For example, such materials include appropriate polyacrylic acid, polymaleic acid, and polyacrylic/polymaleic and copolymers and their salts, such as those sold by BASF under the trade mark Sokalan.

The builders generally constitute from 0 to 3 wt %, more preferably from 0.1 to 1 wt %, by weight of the compositions.

Compositions which comprise an enzyme may optionally contain materials which maintain the stability of the enzyme. Such enzyme stabilizers include, for example, polyols such as propylene glycol, boric acid and borax. Combinations of these enzyme stabilizers may also be employed. If utilized, the enzyme stabilizers generally constitute from 0.1 to 1 wt % of the compositions.

The compositions may optionally comprise materials which serve as phase stabilizers and/or co-solvents. Examples are $C_1$-$C_3$ alcohols such as methanol, ethanol and propanol. $C_1$-$C_3$ alkanolamines such as mono-, di- and tri-ethanolamines can also be used, by themselves or in combination with the alcohols. The phase stabilizers and/or co-solvents can, for example, constitute 0 to 1 wt %, preferably 0.1 to 0.5 wt %, of the composition.

The compositions may optionally comprise components which adjust or maintain the pH of the compositions at optimum levels. The pH may be from, for example, 1 to 13, such as 8 to 11 depending on the nature of the composition. For example a dishwashing composition desirably has a pH of 8 to 11, a laundry composition desirable has a pH of 7 to 9, and a water-softening composition desirably has a pH of 7 to 9. Examples of pH adjusting agents are NaOH and citric acid.

The containers may themselves be packaged in outer containers if desired, for example non-water soluble containers which are removed before the water-soluble containers are used.

The containers of the present invention have the advantage of reduced risk of leakage by pinholes as compared to containers made from a non-laminated single film. Furthermore, it has been found that water-soluble containers stored in an environment where water damage may occur have further advantages. For example, containers containing detergents or other household products are often stored under the sink, where water may drip or flood. Furthermore droplets of water may contact the containers if they are picked up by a person with wet hands. If the outside of the container is moistened, the containers will tend to stick to each other. If the container is formed from a single, non-laminated film, the film material will rupture when the containers are separated. It has now been surprisingly discovered that the use of a laminated film reduces or can even eliminate this risk. Though the layers of the film are laminated together, only the outer layer will rupture when two container which are sticking together are separated. Thus the container will still fully enclose the composition, which will not leak out.

The present invention is further explained in the following Examples:

EXAMPLE 1

Production of Dishwashing Containers

A PVOH polymer, Aquafilm L712D, obtained from Aquafilm Limited, was extruded and blown to form a bubble having a film thickness of 60 μm. The film was then collapsed, the edges removed and wound on a core to form a reel.

Separately, another PVOH polymer, Solublon PT75, obtained from Aicello, was solution cast to form a film having a thickness of 75 μm. The film was wound on another core to form a reel.

The two reels were then placed on a Tiromat Powerpack 320 thermoforming machine. Two blown films (i.e. a collapsed bubble) and a single solution cast film were fed at a film speed of 3 metres per minute into a thermoforming mould to produce small pockets and simultaneously laminate the films. The forming conditions were a temperature of 123° C. and a pressure of 1 atmosphere and the solution cast film formed the inner surface of the pocket. The thermoforming step laminated the films together such that they could not be separated by peeling them apart.

The pockets produced were filled with 18.5 ml of a dishwashing liquid. A lidding film of solution cast Solublon PT75 having a thickness of 75 μm was placed on top of the filled pockets and heat-sealed at a temperature of 165° C. for 2 seconds at a sealing pressure of 350 kPa (3.5 Bar).

The seal was found to have a seal integrity strength of 80 kgf, measured using a Hounsfield HK10S compression tester fitting with a 1 kN load cell.

EXAMPLE 2

The process of Example 1 was repeated except that the blown film used was a single layer of Aquafilm L712D having a thickness of 50 μm and the container was filled with a laundry liquid. The seal was found to have an integrity strength of greater than 80 kgf, measured as in Example 1.

EXAMPLE 3

The process of Example 1 was repeated except that the blown film consisted of a collapsed bubble of Aquafilm L712D having a total thickness of 150 μm (each individual film having a thickness of 75 μm), the solution cast film was Kuraray L70 having a thickness of 76 μm, obtained from Soltec Developpment, the container was filled with the same laundry liquid used in Example 2 and the lidding film was the solution cast film Kurraray L70 having a thickness of 76 μm. The seal was found to have an integrity strength of 75 kgf, measured as in Example 1.

EXAMPLE 4

The process of Example 1 was repeated except that the blown film was a single Aquafilm L712D layer having a thickness of 60 μm, the solution cast film was Monosol M8630 having a thickness of 76 μm, obtained from Greensol S.A., and the lidding film was the solution cast film Monosol M8630 having a thickness of 76 μm. The seal was found to have an integrity strength of a little less than 35 kgf, due to the presence of water in the dishwashing liquid.

COMPARATIVE EXAMPLE 5

Example 1 was repeated except for using a single blown Aquafilm L712D film having a thickness of 190 μm, and no solution cast film. The seal integrity strength was 5 kgf, measured as in Example 1.

COMPARATIVE EXAMPLE 6

Example 2 was repeated except for using two Aquafilm L712D blown films, each having a thickness of 60 μm, and no solution cast film. The films were simultaneously thermoformed and laminated together. The seal integrity strength was 80 kgf, measured as in Example 1.

COMPARATIVE EXAMPLE 7

Example 4 was repeated except for using a single Aquafilm L712D blown film having a thickness of 120 μm. The seal integrity strength was 5 kgf, measured as in Example 1.

The invention claimed is:

1. A process for preparing a water-soluble container having a thermoformed pocket and a lid, said process comprising:
    a. producing a laminated film containing a pocket, said laminated film comprising at least one extruded polyvinyl alcohol film laminated to at least one solution cast polyvinyl alcohol film, wherein the extruded polyvinyl alcohol film has a glass transition temperature (Tg) in the range of about 20 to 30° C. and the solution cast polyvinyl alcohol film has a glass transition temperature (Tg) in the range of about −4 to −50° C.;
    b. filling the pocket with a composition; and
    c. placing a film on top of the filled pocket to produce a closed container, sealing the film to the pocket to produce a sealed container, and wherein the lid comprises a solution cast polyvinyl alcohol film on a surface facing the pocket of the container.

2. A process according to claim 1 wherein the extruded film is a blown film.

3. A process according to claim 1 wherein the extruded film is an extrusion cast film.

4. A process according to claim 1 wherein the laminate consists of a single extruded film polyvinyl alcohol laminated to a single solution cast polyvinyl alcohol film.

5. A process according to claim 1 wherein each film of the laminate independently has a thickness of from 40 to 100 μm.

6. A process according to claim 1 wherein the total thickness of all of the extruded polyvinyl alcohol films is less than the total thickness of all of the solution cast polyvinyl alcohol films.

7. A process according to claim 1 wherein the composition is a liquid composition.

8. A process according to claim 1 wherein the composition is a fabric care composition, a surface care composition, a dishwashing composition, a water-softening composition, a laundry composition, a detergent composition or a rinse-aid composition.

9. A process according to claim 1 wherein the composition is a disinfectant composition, an antibacterial composition or an antiseptic composition.

10. A process according to claim 1 wherein the composition is an agricultural composition.

11. A process according to claim 1 wherein the laminate layer on the inside of the pocket of the container is a solution cast polyvinyl alcohol film.

12. A process according to claim 1 wherein the films are laminated before being formed into a pocket.

13. A process according to claim 1 wherein the films are laminated at the same time that the pocket is formed.

* * * * *